Dec. 16, 1930.  S. TREY  1,785,333
HELICOPTER
Filed Nov. 18, 1926  2 Sheets-Sheet 1
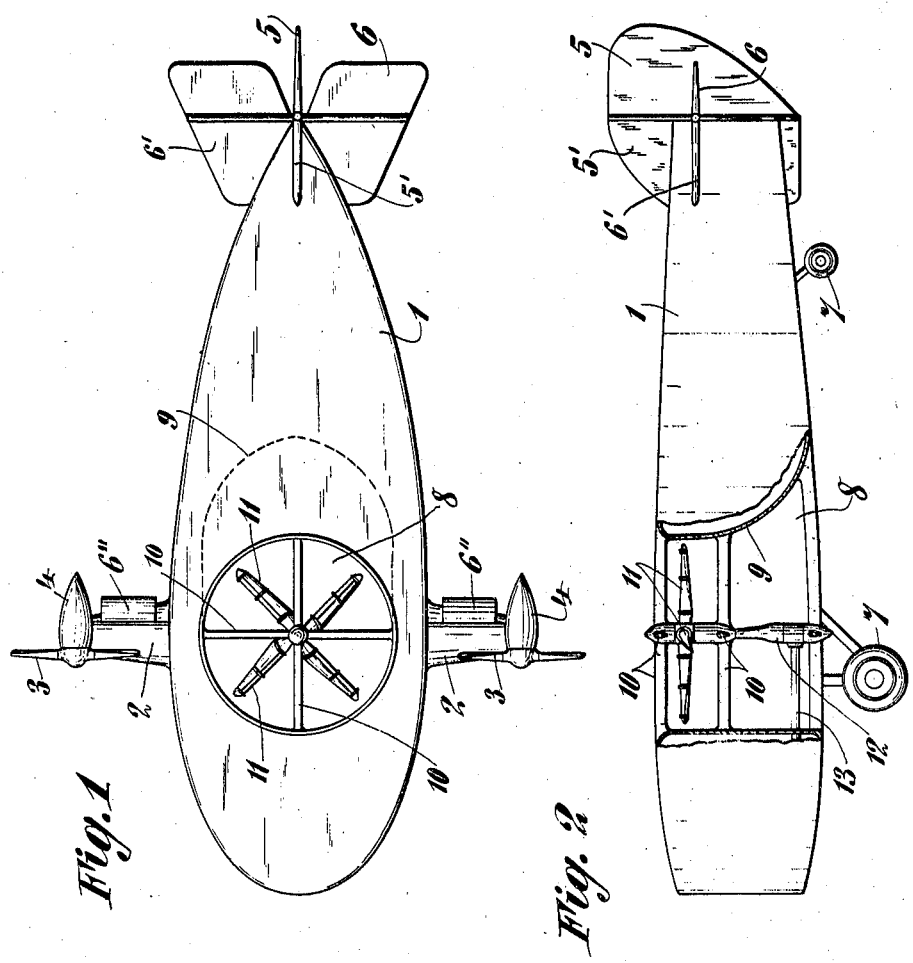
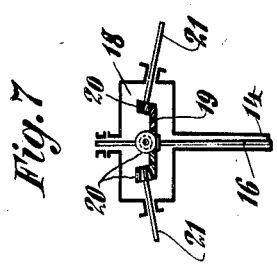
INVENTOR:
Serge Trey.
BY HIS ATTORNEY
Alexander Chessin

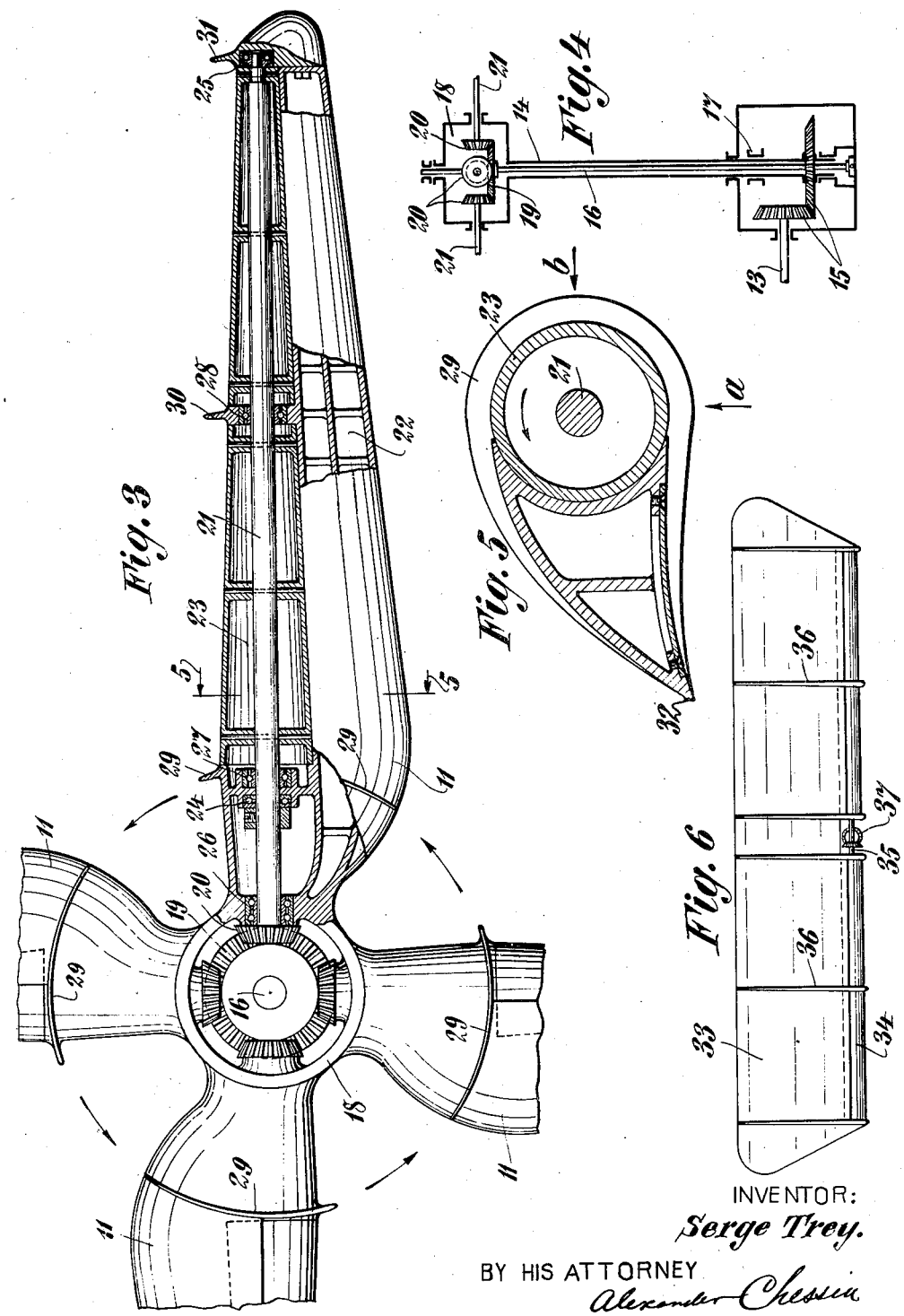

Patented Dec. 16, 1930

1,785,333

UNITED STATES PATENT OFFICE

SERGE TREY, OF STAMFORD, CONNECTICUT

HELICOPTER

Application filed November 18, 1926. Serial No. 149,034.

My invention relates to heavier than air flying ships and, more particularly, to direct lift air craft or helicopters.

One of the objects of my invention is to increase the lifting capacity of the air craft by increasing the efficiency of the sustaining aerofoils. Another object is to utilize the so called Magnus effect, by combining rotors with the aerofoils. Still another object is to diminish both the structural and the air resistances. Other objects will become apparent from the detailed description of my invention which follows.

In the drawings, Figure 1 is a top view of a helicopter embodying one form of my invention; Figure 2 is a side view of the same craft, partly in section; Figure 3 is a plan view of the aerofoils forming the main element of the apparatus shown in Figures 1 and 2, looking from below, portions of the aerofoil surface being broken off to show the working of the device; Figure 4 is a schematic view of the driving mechanism used in this form of my invention; Figure 5 is a section along the line 5—5 of Figure 3; Figure 6 is a top view of an aeroplane wing showing another form of my invention, as applied to stationary aerofoils; and Figure 7 is a partial view of a modification of the driving mechanism shown in Figure 4.

Referring to the drawings in detail, in Figures 1, 2 and 4, 1 is the fuselage of the air craft; 2, 2, are extensions thereof laterally projecting therefrom and carrying propellers 3 with individual motors (not shown) contained in the streamlined casing 4; 5 and 5' are respectively the rudder and tail fin of the craft; 6 and 6', respectively, the elevator and the stabilizer; 7, 7, are wheels of the landing gear; 8 is a tunnel through the fuselage 1, streamlined at 9 for the downward flow of air currents; 10 are cross members, also streamlined for the downward flow of air currents; 11 are aerofoils carried on the vertical shaft 14, within the casing 12, the shaft 14 being revolved by means of the gearing 15 which is actuated by the horizontal shaft 13 connected to a source of power (not shown) in the forward end of the fuselage 1. The vertical shaft 14, as shown in Figure 4, is hollow and revolves on a stationary vertical shaft 16, fixed at its two ends to the fuselage; it is provided with suitable thrust bearings, schematically indicated at 17. The casing 18, fixed to the hollow shaft 14, revolves therewith, and the aerofoils 11, attached to the casing 18, are thus caused to rotate about a vertical axis.

On the stationary shaft 16 is fixed a stationary bevel gear 19, meshing with the bevel gears 20 attached to the axles 21. The rotation of the casing 18 causes the gears 20 to travel on the gear 19, whereby the gears 20 are made to rotate on their axles 21 with an angular velocity having a predetermined ratio to the angular velocity of the casing 18 about the vertical, this predetermined ratio being fixed by the ratio of the gears 19 and 20.

In Figures 3 and 5 is shown the construction of the aerofoils 11, enlarged. The aerofoils are of ribbed design, as is shown at 22, Figure 3, where the surface of the aerofoil is broken away to disclose the internal structure, and as is also shown in Figure 5. A hollow rotor 23, closed at both ends, tapering towards the tip of the aerofoil, is shown in the drawing as made up in several sections fixedly attached to the axle 21 and revolving therewith. It is not necessary to build up the rotor in sections and it is so shown in the drawing only because this construction is better from an engineering standpoint. It will be observed that the rotor 23 forms the leading edge of the aerofoil.

The aerofoil 11 tapers towards it tip alongside with the rotor 23, the diameter of the rotor 23 having at any point of its axis a predetermined ratio to the width of the aerofoil at that point. In the drawing, the diameter of the rotor 23 is shown as proportional to the width of the aerofoil at each point, but I do not wish to limit the construction to this specific relation which is given merely as an illustration. In some cases, I prefer to make the ratio of the aerofoil width to the rotor diameter vary for different points along the rotor axis.

To take care of the centrifugal thrust in the aerofoil 11, I provide it with suitable thrust bearings. In the drawing, a combined journal and thrust ball bearing is shown at 25, near the tip of the aerofoil, and a thrust bearing 24 near its other end. Ball bearings 26, 27 and 28 are also provided, to facilitate the action of the rotor 23.

In order to prevent leakage from the pressure area and to obstruct the passage of the surrounding air into the suction area, and to otherwise eliminate undesirable air currents and, at the same time, utilize all air currents to the best advantage, I provide my revolving aerofoil with a series of fins 29, 30, 31, properly streamlined. These fins surround the aerofoil and diminish in width from the leading edge (rotor 23) towards the trailing edge, 32, where they vanish. It will be observed that, although these fins surround the rotor 23, they do not participate in its rotation. They are shown in the drawing as disposed along concentric circles, but I do not wish to limit them to this specific position and I may, when the aerofoil characteristics make this preferable, dispose the fins along different lines.

In Figure 6, 33 is a wing of an aeroplane; 34 is a hollow cylinder, closed at both ends and revolving on an axle 35; 36 are streamlined fins; and 37 are gears through which rotation of the axle 35 is effected from a source of power, not shown. In the drawing, the fins 36 are shown as disposed at a right angle to the axis of the rotor 34, but it is to be understood that the angle between the rotor axis and the fins may be different from a right angle. Nor are the fins 36 to be limited as being disposed along straight lines. For wings of certain characteristics, I prefer to dispose the fins along curved lines.

The operation of the device will now be briefly explained.

To effect a direct lift of the craft, I start the motor (not shown) which sets the aerofoils 11 in rotation about the vertical axis, in the direction of the arrow (Figure 3), thereby simultaneously impressing upon the rotors 23 an angular velocity in a predetermined ratio to the angular velocity of the aerofoils. In the drawing, this predetermined ratio is approximately three to one, but, in the practice of my invention, this ratio is usually much greater, effective results being obtainable with a ratio of about eight or ten to one. The determination of the best ratio for any particular craft is a purely engineering problem involving considerations of wind velocity, speed of revolution of the aerofoils, aerofoil characteristics, relation of total aerofoil surface to exposed rotor surface, and other factors, all of which is within the ken of those skilled in the art.

The direction of rotation of the rotor 23 is indicated by the arrow in Figure 5. The pressure of air against the rotor forming the leading edge of the aerofoil, indicated in Figure 5 by the arrow $b$, develops a lifting force indicated in the same figure by $a$, in accord with the Magnus law. This lifting force $a$ is added to the lifting capacity of the revolving aerofoil 11 considered as a vertical thrust propeller, thus greatly increasing the lifting efficiency of the craft.

The effect in the case of an aeroplane wing is similar, here, again, a lifting force $a$, due to the Magnus effect, being added to the lifting capacity of the aeroplane.

The importance of the fins in both, the revolving and the stationary types of aerofoil, should not be lost sight of. The fins add almost one hundred percent to the efficiency of the device.

By locating the revolving aerofoils in the tunnel 8, entirely within the fuselage, I facilitate the flow of air which rushes downward with a backward sweep through the tunnel and I prevent currents in the surrounding air from interfering with the effective action of the aerofoils. The tunnel is streamlined, as shown, to reduce the air and structural resistances. The cross members 10 not only strengthen the fuselage around the tunnel, but act to break up any air twists or eddies that may form within it. The cross members 10 are also streamlined for the downward flow of air currents.

While the position of the aerofoils 11 within the tunnel 8 is the one I prefer in the practice of my invention, I do not wish to be understood as claiming that a direct lift machine can not be built which embodies my invention with the revolving aerofoils otherwise located, so long as these aerofoils comprise the feature of the rotor forming the leading edge thereof, and, accordingly, my invention is not limited to the particular, preferred form, shown in the drawings and comprising a tunnel through the fuselage, or to the particular position of the aerofoils in said tunnel.

Various ways may be devised for effecting the fore and aft motion of my direct lift air craft. As illustrated in the drawings, one way is to provide propellers 3 on lateral extensions of the fuselage, the propulsion of the craft in the fore and aft direction being effected in the same manner as in an aeroplane. The steering apparatus comprises the usual elements, such as the rudder 5 and tail fin 5'; the elevator 6 and stabilizer 6'; and the ailerons 6", on the lateral extensions 2 of the fuselage. The propellers 3 may be actuated by independent motors in casings 4, or from the source of power which actuates the revolving aerofoils.

In the revolving type of my aerofoil, the rotor 23 is made to taper towards the tip of the aerofoil, to conform with dynamic laws. In the case of an aeroplane wing, the rotor is of cylindrical shape, ordinarily, but, just as in the case of the revolving aerofoil, and as explained above, the diameter of the rotor may have a predetermined ratio to the width of the plane at any point of the rotor axis, and if this ratio varies from point to point, the rotor will no longer be of a cylindrical shape.

The axis of the rotor 23, in Figure 4, is shown as being at a right angle to the axis of revolution of the aerofoils. In Figure 7, I have shown a modification of this construction, with a different inclination of the axles 21 of the rotors to the axis of revolution of the aerofoils.

Other variations of my device may be made by those skilled in the art, without detracting from the scope or spirit of my invention, and need not be enumerated here.

I claim:

1. In an aerofoil, the combination with a rotor forming the leading edge thereof, of a fairing, and one or more fins surrounding said rotor and said fairing.

2. In an aerofoil, the combination with a rotor disposed at the leading edge thereof, of a fairing and one or more fins surrounding said rotor and said fairing at right angles to the axis of said rotor.

3. In an aerofoil, the combination with a rotor forming the leading edge thereof, of a fairing and one or more streamlined fins surrounding said rotor and said fairing and vanishing at the trailing edge thereof.

4. The combination with an aerofoil, of a rotor disposed at the leading edge thereof, and one or more stationary fins surrounding said rotor.

5. In an aerofoil tapering towards its tip the combination with a rotor disposed to form the leading edge thereof, of a fairing of varying width, the diameter of said rotor in any plane perpendicular to its axis having a predetermined ratio to the width of said fairing in said plane.

6. In an aerofoil tapering towards its tip, the combination with a rotor disposed lengthwise thereof, of a fairing of varying width the diameter of said rotor in any plane perpendicular to its axis being proportional to the width of said aerofoil in said plane.

7. The combination with a revolving aerofoil, of a rotor forming the leading edge thereof, and fins surrounding said aerofoil and fixed thereto along concentric circles about the axis of revolution of said aerofoil.

8. In a helicopter, a system of revolving aerofoils tapering from a point near their axis of revolution towards the tips, and a rotor disposed at the leading edge of each one of said aerofoils, said aerofoils being located entirely within said fuselage.

9. In a helicopter, a tunnel through the fuselage thereof, a system of aerofoils revolving in said tunnel, said aerofoils tapering from a point near their axis of revolution towards the tips, and a rotor disposed at the leading edge of each one of said aerofoils.

10. A helicopter comprising a fuselage, a tunnel therethrough, cross members in said tunnel, a system of aerofoils adapted to revolve in said tunnel about a normally vertical axis, said aerofoils tapering from a point near said vertical axis towards the tips, a rotor disposed at the leading edge of each one of said aerofoils and tapering towards the tip thereof proportionally to the taper of the aerofoils, fins on said aerofoils disposed along concentric circles about their axis of revolution, means for rotating said aerofoils, means for impressing upon said rotors an angular velocity in a predetermined ratio to the angular velocity of said aerofoils, means for propelling said aircraft in the fore and aft direction, and means for steering said aircraft.

11. An aerofoil, comprising a tapering rotor disposed at the leading edge thereof, a correspondingly tapering fairing the thickness of said fairing decreasing from said rotor towards the trailing edge of said aerofoil, and fins surrounding said aerofoil and vanishing at the trailing edge thereof.

SERGE TREY.